Figure 1:
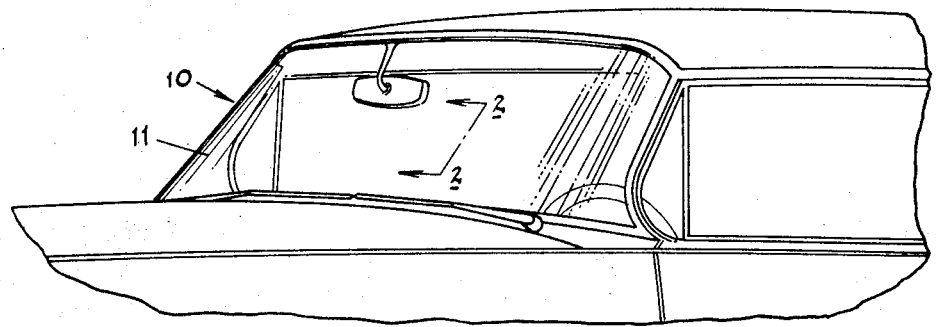

INVENTOR.
Joseph D. Ryan
BY Nobbe & Swope
ATTORNEYS

United States Patent Office 3,351,518
Patented Nov. 7, 1967

3,351,518
LAMINATED GLASS STRUCTURE
Joseph D. Ryan, Toledo, Ohio, assignor to Libbey-Owens-Ford Glass Company, Toledo, Ohio, a corporation of Ohio
Filed Dec. 14, 1962, Ser. No. 244,652
3 Claims. (Cl. 161—199)

The present invention relates generally to laminated glass structures and, more particularly, to an improved glass-plastic viewing closure which is especially well adapted for use as an automobile windshield or the like.

In general, the conventional laminated windshield presently employed in automotive vehicles comprises two sheets of clear plate glass, each having a nominal thickness of ⅛ inch, integrally bonded together by means of an interposed, colorless and transparent plastic interlayer, e.g. composed of a polyvinyl butyral resin having a thickness of about .015 inch. These conventional windshields have a total visible light transmittance (Illuminant C) in the range of approximately 88 to 90 percent and a total solar radiation transmittance of approximately 79 to 81 percent. Due to this high solar radiation transmittance property and the resulting heat input into the interior of the automobile, various attempts have been made to decrease the solar transmittance while still maintaining the visible light transmittance at an acceptable level. In this respect, the present A.S.A. code for windshields requires a minimum total visible light transmittance of 70 percent.

Thus, in automobile windshields constructed with anti-glare and heat reducing properties primarily in mind, it has been customary to employ a special heat absorbing glass which normally contains relatively high amounts of iron oxide in combination with a plastic interlayer having a colored glare-reducing portion which is graduated to give a shaded effect. In this respect, an additional purpose or function of the heat absorbing glass is to protect the colored shaded portion of the plastic against fading due to the ultraviolet rays of the sun. The colored glare-reducing portion of the interlayer in these windshields can, however, only be located above the normal viewing area of the windshield due to the extremely low light transmittance obtained with the use thereof. Thus, the light transmittance of the colored shaded area at the densest portion thereof is on the order of 5 percent and it accordingly must be graduated to substantially the transmission of clear plastic in that portion extending through the viewing area itself thereby providing little or no deterrent to high solar radiation transmittance in the latter area.

It has also been customary to employ two sheets of a heat absorbing glass in combination with a clear plastic interlayer in an attempt to alleviate the transmittance of excessive solar radiation into the interior of the automobile. However, while such a windshield satisfies the A.S.A. code, i.e. has a total visible light transmittance in the range of 71 to 74 percent, and possesses low solar radiation transmittance, namely, in the range of 43 to 46 percent, it is not itself colorless, possessing a greenish-blue color nor, and most importantly, is it neutral, i.e. permitting colors to be viewed therethrough without distorting such colors. Accordingly, a need has developed for a substantially colorless, neutral laminated glazing unit having high solar heat absorbing qualities as well as a high visible light transmittance, which combination of properties has not heretofore been found compatible.

It is therefore a primary object of the present invention to provide an improved laminated glass glazing unit.

Another object of the invention is to provide a substantially colorless, neutral laminated glass glazing unit having a relatively high visible light transmittance combined with a relatively high solar radiation absorption characteristic.

Other objects and advantages of the invention will become more apparent during the course of the following description when read in connection with the accompanying drawings.

Figure 2:
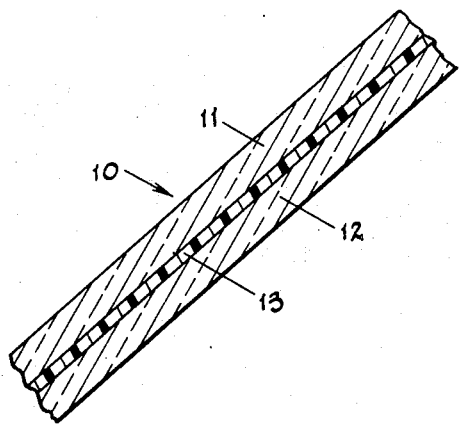

In the drawings, wherein like numerals are employed to designate like parts throughout the same:

FIG. 1 is a fragmentary, perspective view of an automobile having a windshield comprising the improved laminated glass glazing unit in accordance with the present invention; and FIG. 2 is a fragmentary, sectional view taken along the line 2—2 of FIG. 1.

Briefly stated, the laminated glass structure of the present invention comprises a first glass sheet consisting of a heat absorbing plate glass, a second glass sheet composed of a clear plate glass, and an interposed plastic interlayer comprising a plasticized polyvinyl butyral resin pigmented with carbon black integrally bonded to each of the glass sheets to provide a composite structure. When the laminated structure is to be used in automobile applications, e.g. an automobile windshield or backlite, it is preferred that the first or heat absorbing sheet be the outboard lite. It has been found that this novel glazing unit has an acceptable low total solar radiation transmittance of less than 58 percent, e.g. in the range of approximately 50 to 56 percent, and additionally possesses all of the other highly important desirable properties enumerated above.

Referring now more particularly to the drawings, FIG. 1 illustrates the use of a laminated glass structure formed in accordance with the invention in an automobile windshield which is indicated generally at 10. As shown in FIG. 2, the windshield 10 consists of two sheets of glass 11 and 12 integrally bonded to an interposed layer of plastic 13 which is basically comprised of a vinyl butyral resin and a plasticizer.

As heretofore mentioned, it is preferred, when employing the laminated structure as an automobile glazing, that the outboard lite be composed of a heat absorbing glass. Thus, the lite 11 in the embodiment illustrated is composed of a soda-lime-silica plate glass containing a relatively high amount of iron oxide, while the inboard lite or glass sheet 12 is composed of a clear soda-lime-silica plate glass.

It has been found that the carbon black impregnated plastic interlayer 13 employed in the windshield must have a total visible light transmittance in the range of about 78 to 85 percent in order to be acceptable. Thus, in formulating the interlayer composition in accordance with the invention, the basic vinyl butyral resin is internally and homogeneously mixed with finely divided carbon black until a pigmented resin having a light transmittance in the above range at the thickness thereof desired is obtained. Such an interlayer, in combination with a sheet of heat absorbing plate glass and a sheet of clear plate glass results in a laminated unit having a total visible light transmittance of over 70 percent, a total solar radiation transmittance of less than 58 percent and preferably less than 55 percent, and additionally is, for all intents and purposes, colorless and neutral with regard to color transmission.

In accordance with a preferred embodiment of the invention, the outboard lite 11 consists of a nominal ⅛ inch thick plate glass sheet having essentially the following composition:

| | Percent by weight |
|---|---|
| $SiO_2$ | 72.06 |
| $Fe_2O_3$ | 0.475 |
| $Al_2O_3$ | 0.19 |
| $TiO_2$ | 0.011 |
| CaO | 11.12 |
| MgO | 2.04 |
| $Na_2O$ | 13.81 |
| $SO_3$ | 0.36 |
| $As_2O_5$ | 0.002 |

The inboard lite 12 consists of a sheet of nominal ⅛ inch thick clear plate glass of essentially the following composition:

| | Percent by weight |
|---|---|
| $SiO_2$ | 72.17 |
| $Fe_2O_3$ | 0.126 |
| $Al_2O_3$ | 0.14 |
| $TiO_2$ | 0.012 |
| CaO | 11.23 |
| MgO | 2.04 |
| $Na_2O$ | 13.84 |
| $SO_3$ | 0.34 |
| $As_2O_5$ | 0.17 |

The plastic interlayer 13 is composed of 100 parts by weight of polyvinyl butyral resin, 40 parts by weight of ethylene glycol dibutyl ether plasticizer, and .0035 part by weight carbon black.

In making a laminated structure according to the invention, the interlayer was first prepared by dispersing the carbon black in the ethylene glycol ether and then milling this dispersion with the polyvinyl butyral resin until a homogeneous admixture was derived. The admixture was thereafter formed into a sheet having a thickness of .015 inch, which sheet thickness of the above composition resulted in an interlayer having a total visible light transmittance of 80 percent. After conventional lamination of the glass sheets and plastic interlayer, the resulting laminate had a thickness of .261 inch, a total visible light transmittance (Illuminant A) of 71.1 percent, a total visible light transmittance (Illuminant C) of 72.0 percent, and a total solar radiation transmittance of 52.5 percent. The laminate was substantially colorless, possessing only a very slight grayish hue, and was neutral with no noticeable change in the natural color of objects being observed when viewed therethrough.

For comparative purposes, a laminate composed of two sheets of clear or regular plate glass of nominal ⅛ inch thickness and an interlayer of the same carbon black pigmented, vinyl butyral resin as set forth above, i.e. having a total visible light transmittance of 80 percent, showed the following properties:

| | |
|---|---|
| Thickness of laminate inch | .257 |
| Percent total transmittance Illuminant A | 72.7 |
| Percent total transmittance Illuminant C | 72.3 |
| Percent total solar radiation transmittance | 66.5 |

Thus, it will be noted that while this laminate is acceptable insofar as its visible light transmitting properties are concerned, it fails to reduce the total solar radiation transmittance to a satisfactory low level such as desired in anti-glare and heat reducing windshields, i.e. below 58 percent and preferably below 55 percent.

Further, a laminate composed of two ⅛ inch thick sheets of heat absorbing glass, having the same composition as set forth above, and a carbon black pigmented, vinyl butyral resin interlayer, again having a total visible light transmittance of 80 percent, while exhibiting an excellent low solar radiation transmittance, failed to give a total visible light transmittance of 70 percent and was therefore unacceptable.

I claim:

1. A laminated glass glazing unit having a total visible light transmittance of more than 70 percent and a total solar radiation transmittance of less than 58 percent, comprising a first sheet of an iron oxide-containing heat absorbing plate glass, a second sheet of regular clear plate glass, and a plastic interlayer interposed between and bonded to both said first and second glass sheets, said interlayer being composed of a vinyl butyral resin internally and homogeneously pigmented with carbon black and having a total visible light transmittance in the range of about 78 to 85 percent.

2. A laminated glass glazing unit having a total visible light transmittance of more than 70 percent and a total solar radiation transmittance of less than 55 percent, comprising a first sheet of an iron oxide-containing heat absorbing plate glass, a second sheet of regular clear plate glass, and a plastic interlayer interposed between and bonded to both said first and second glass sheets, said interlayer being composed of a vinyl butyral resin internally and homogeneously pigmented with carbon black and having a total visible light transmittance of approximately 80 percent.

3. An automobile windshield, comprising a first approximately ⅛ inch thick sheet of an iron oxide-containing heat absorbing plate glass, said first sheet forming the outboard lite of said windshield, a second approximately ⅛ inch thick sheet of regular clear plate glass forming the inboard lite of said windshield, and a plastic interlayer interposed between and bonded to both said first and second glass sheets, said interlayer being composed of a vinyl butyral resin internally and homogeneously pigmented with carbon black and having a total visible light transmittance in the range of about 78 to 85 percent, said windshield being neutral with respect to the visibility of colors therethrough and having a total visible light transmittance of at least 70 percent and a total solar radiation transmittance of not more than 58 percent.

References Cited

UNITED STATES PATENTS

| 2,444,976 | 7/1948 | Brown | 161—408 |
| 2,860,059 | 11/1958 | Molter et al. | 156—106 |
| 3,069,301 | 12/1962 | Buckley et al. | 161—199 |

MORRIS SUSSMAN, *Primary Examiner.*

EARL M. BERGERT, ALEXANDER WYMAN,
*Examiners.*

W. J. VAN BALEN, *Assistant Examiner.*